A. R. DODGE.
METER FOR MEASURING THE FLOW OF AN ELASTIC FLUID.
APPLICATION FILED NOV. 13, 1906.
1,087,929.
Patented Feb. 24, 1914.
4 SHEETS—SHEET 1.
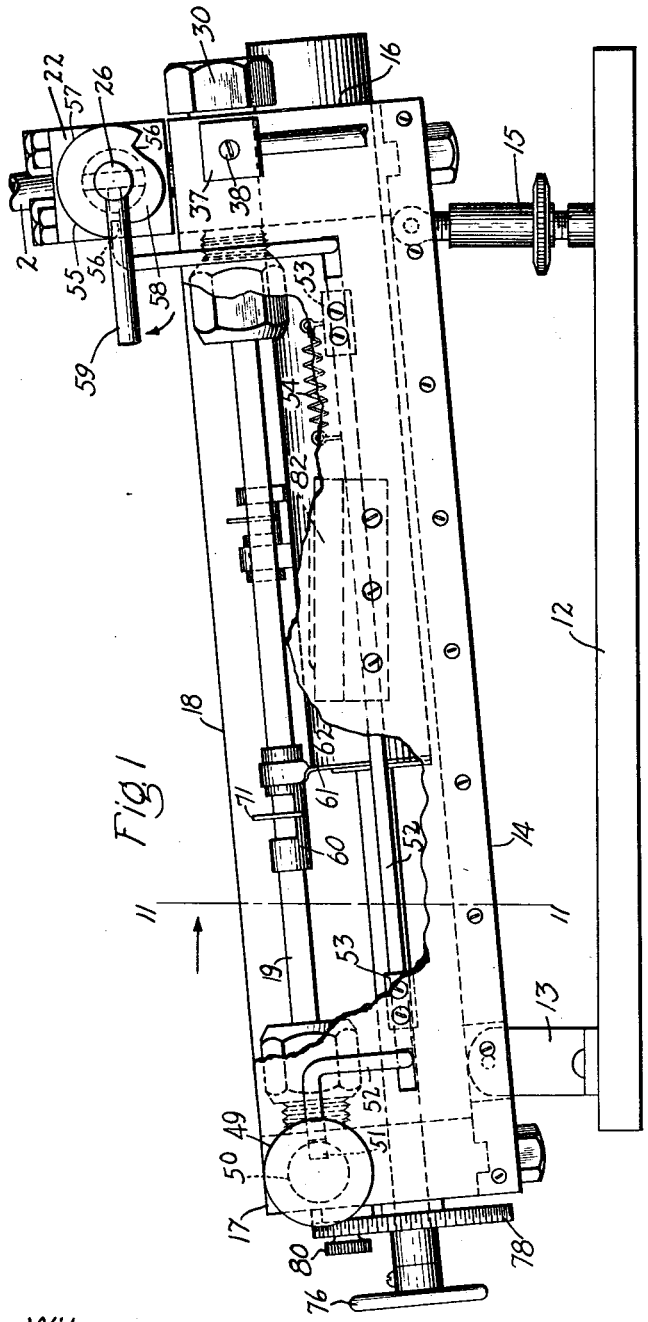
Witnesses:
Lloyd C. Bush
Marcus L. Byng
Inventor:
Austin R. Dodge,
By Albert G. Davis
Atty.

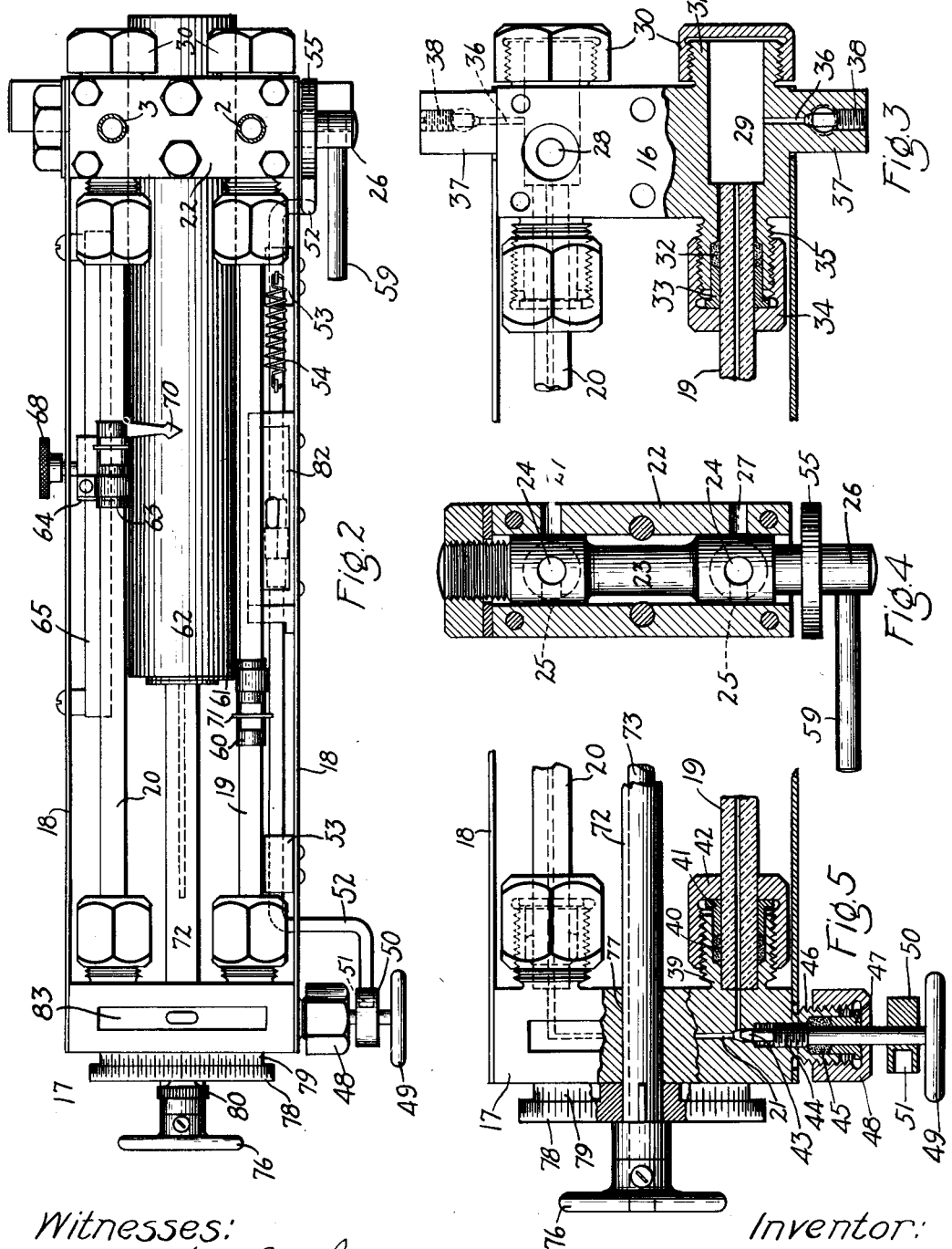

A. R. DODGE.
METER FOR MEASURING THE FLOW OF AN ELASTIC FLUID.
APPLICATION FILED NOV. 13, 1906.
1,087,929.
Patented Feb. 24, 1914.
4 SHEETS—SHEET 3.
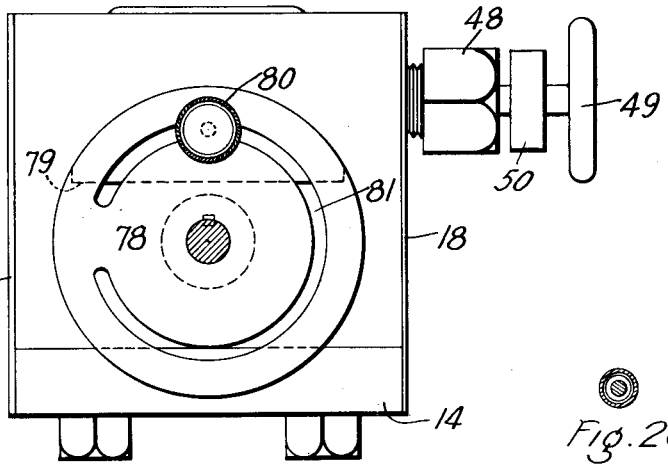
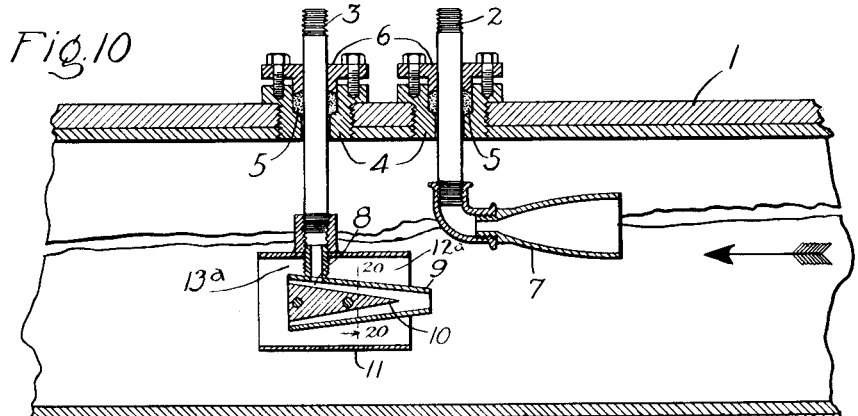
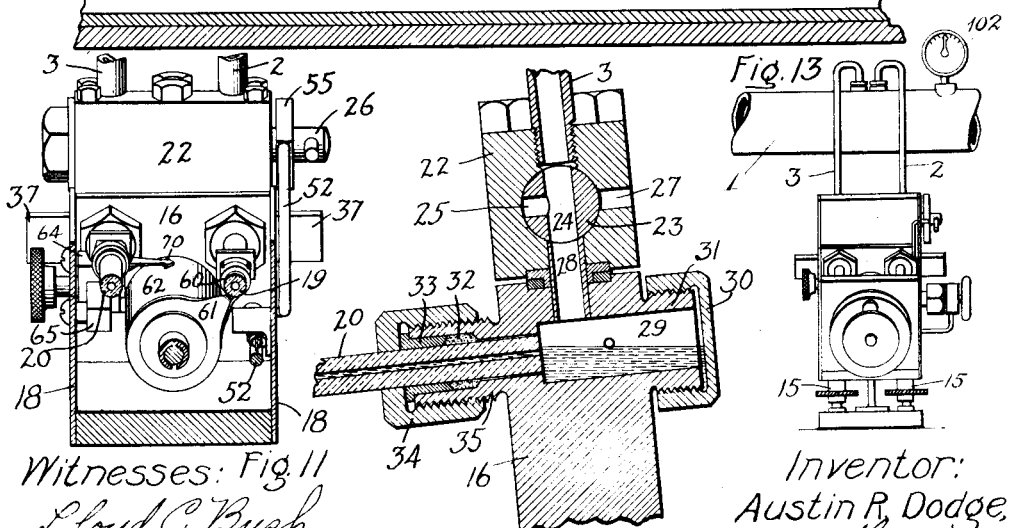
Witnesses:
Lloyd C. Bush
Marcus L. Byng
Inventor:
Austin R. Dodge,
By Albert G. Davis
Atty.

A. R. DODGE.
METER FOR MEASURING THE FLOW OF AN ELASTIC FLUID.
APPLICATION FILED NOV. 13, 1906.
1,087,929.
Patented Feb. 24, 1914.
4 SHEETS—SHEET 4.
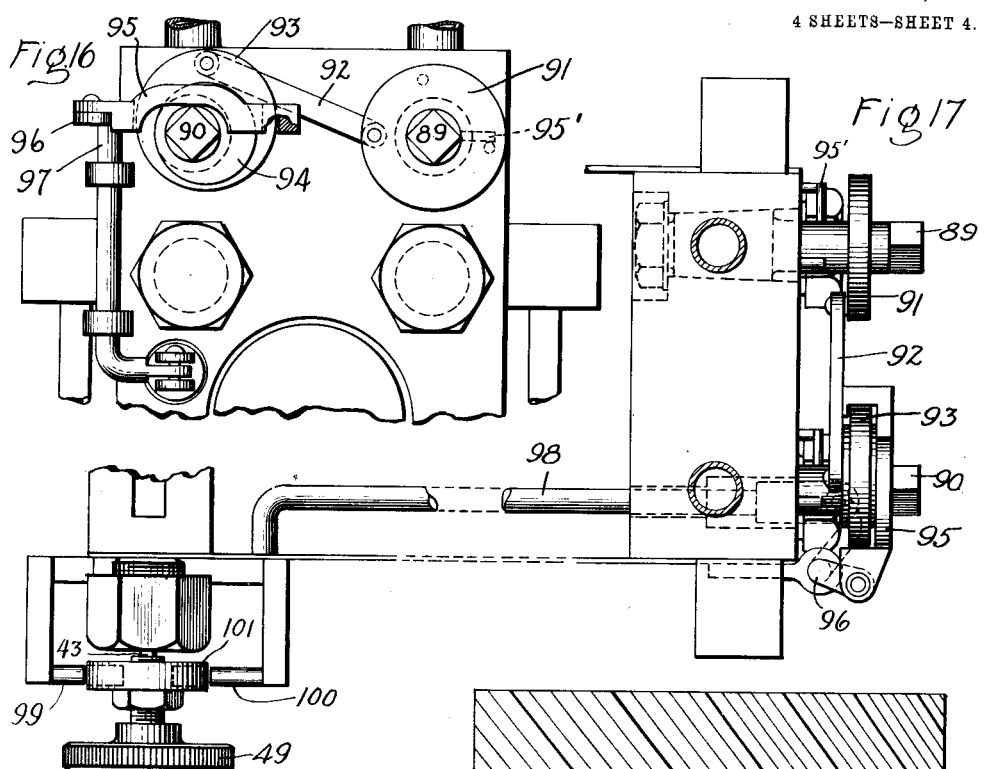
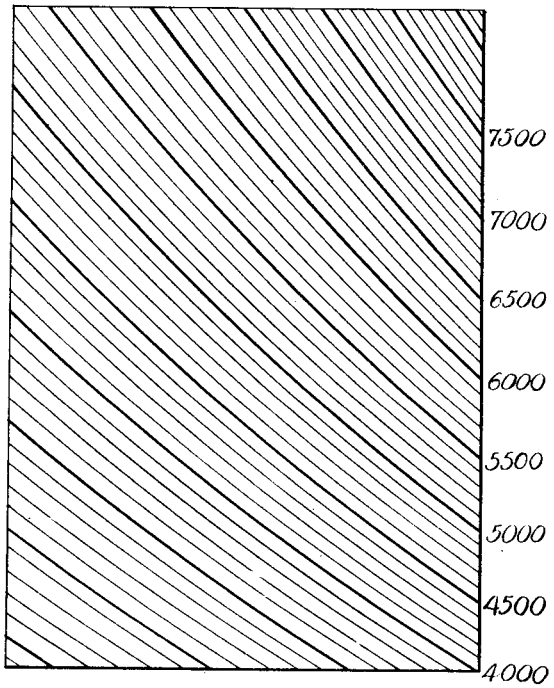
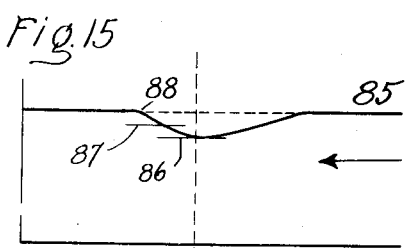
Witnesses:
Lloyd C. Bush
Marcus L. Byng
Inventor:
Austin R. Dodge
By Albert G. Davis
Atty.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

METER FOR MEASURING THE FLOW OF AN ELASTIC FLUID.

1,087,929.  Specification of Letters Patent.  Patented Feb. 24, 1914.

Application filed November 13, 1906. Serial No. 343,197.

*To all whom it may concern:*

Be it known that I, AUSTIN R. DODGE, a citizen of the United States, residing at Schenectady, county of Schenectady, State of New York, have invented certain new and useful Improvements in Meters for Measuring the Flow of an Elastic Fluid, of which the following is a specification.

This invention relates to steam engineering, and its object is to enable one to accurately measure the weight of steam or gas flowing through a main.

In making tests of boilers and engines, in keeping track of expenses in power-stations, in determining the loss in pipe systems for power and heating purposes, and in many other situations, it is essential to ascertain the pounds of steam or gas flowing per unit of time at some predetermined point in the supply pipes. It has been found by experiment that the velocity of steam in a pipe is constant over about eighty per cent. of the cross-section of the pipe. With a pipe of a given cross-section, and steam of a given pressure and density, the quantity passing in a given time is a function of the velocity of the flow.

My invention aims to indicate the velocity at each and every instant, whereby the quantity can be easily determined. This renders the instrument independent of the size of the main, because it is not necessary to pass all the steam through the meter.

The invention consists in a gage of novel construction, and comprising, broadly speaking, a U-shaped tube containing liquid and arranged in shunt to the main, said tube being inclined at an angle to the horizontal to multiply the deflections, and opening into the main through which the fluid to be measured is flowing. In order to further increase the deflections, the ends of said tube are connected with small nozzles located in the main, one of which serves to convert the velocity of a portion of the fluid column into pressure, while the other causes an ejector action which tends to reduce the pressure head at one of the orifices of the tube. The displacement of the liquid indicates the difference in pressure in the two tubes, and consequently, the velocity and quantity of the steam flowing through the pipe. I have found with a certain relation of the nozzles that the flow varies as the 2.6 root of the pressure. I have found mercury to be a satisfactory liquid to use in the U-shaped tube when the meter is used for measuring steam flow, because it will not mix with water and causes little or no friction in moving, but other liquids can be used for this purpose. Where the meter is used for measuring the flow of a gas in a main, as for illuminating purposes, I may use water as the liquid to give the indications. When mercury is used as the indicating medium, provision is made for keeping a body of water above and in contact with the mercury to more sharply define the meniscus and thereby facilitate readings, and for maintaining the water level always the same in each leg of the tube. In order to avoid blowing the mercury or other fluid out of the tube and also the liquid used to sharpen the meniscus, a throttling valve is applied to the gage tube, and the steam valves are interlocked with it so that they cannot be opened except when the throttling valve is closed. The instrument can be adjusted to give correct readings for different steam pressures, superheats and moisture. The details of construction will be elaborated in the full description given below.

In the accompanying drawings, Figure 1 is a side elevation of my improved meter, partly broken away; Fig. 2 is a top plan view; Fig. 3 is a plan, partly in section, of the upper head of the frame, showing the upper ends of the gage tube with the valve chest removed; Fig. 4 is a longitudinal section of the double valve; Fig. 5 is a plan, partly in section, of the lower head of the frame, showing the bight of the U-shaped gage tube, and the throttling valve therefor; Fig. 6 is a section of the scale-bearing cylinder and its adjusting devices; Fig. 7 is a sectional view of the adjustable index; Fig. 8 is a side elevation of the same; Fig. 9 is an end view of the meter, partly in section; Fig. 10 is a section of the steam main and the nozzles; Fig. 11 is a cross-section on the line 11—11, Fig. 1; Fig. 12 is a section through the valve chest, water-chamber and tube section; Fig. 13 is an elevation of the entire meter; Fig. 14 is a detail view showing in section the preferred arrangement of the parts forming the nozzle working on the ejector principle; Fig. 15 is a curve showing the pressure conditions in the ejector nozzle of the previous figure; Fig. 16 is an end view showing independently adjustable valves controlling the admission of pressure to the U-tube; Fig. 17 is a plan view of the same showing the interlocking arrangement with the throttle valve; Fig. 18 is a developed view of the scale adapted to be mounted on the adjustable cylinder to give the readings in pounds per unit of time; Fig. 19 is a section on the line 19—19 of Fig. 14 looking in the direction of the arrow; and Fig. 20 is a section on the line 20—20 of Fig. 10 looking in the direction of the arrow adjacent said section line.

The instrument is placed in any convenient position and preferably lower than the pipe 1 through which is passing the steam or other elastic fluid whose amount is to be measured. The size of the pipe is immaterial, as the same meter can be used for different sizes of steam mains by a suitable change in the scale or by making proper allowances in the readings. The object of placing the meter below the point of attachment to the pipe is to insure the draining of the supply pipes, provision being made for the escape of water of condensation. It is to be noted that the main steam pipe is not throttled as in other types of meters and while the nozzles connected to the U-tube appear to be large with respect to the inside diameter of the main, they are not so in fact. For the purpose of illustration I have shown the nozzles somewhat enlarged and the main broken away.

The pipes 2 and 3 connecting the meter with the main 1 are inserted into the main through steam-tight joints, preferably consisting of screw plugs 4, Fig. 10, which are provided with packing 5 and glands 6 so as to serve as stuffing boxes. On the inner end of the pipe 2 is a small nozzle 7 preferably flaring in shape, with its mouth open toward the column of steam and transverse thereto. I may make this inlet nozzle 7 in a variety of ways, the one shown giving satisfactory results in actual service. A certain predetermined and small portion of the steam is intercepted by this nozzle and the velocity head of the steam is changed into a pressure head which causes a deflection of the mercury or other column. The inner end of the pipe 3 is also provided with a nozzle which produces an increased velocity of the steam past the end of said pipe and thus causes a suction therein which exerts its effect upon the other end of the mercury column, and tends to increase its deflection. This suction or outlet nozzle preferably consists of a truncated conical tube 9 open at both ends, with the small end presented toward the approaching steam. Inside the tube 9 is a cone 10 which is fixed in position, after being adjusted for purposes of calibration or otherwise. The nozzle is surrounded by a cylindrical pipe 11, having a larger effective cross-section at $12^a$ than at $13^a$. As a result the velocity at $13^a$ tends to increase, thereby causing an ejector action at the discharge of the nozzle 9. The expansion ratio of nozzle 9, i. e., the ratio of admission area to discharge area is such that the steam is overexpanded in such a manner as to give a pressure curve similar to Fig. 15. The connection to pipe 3 is made at the point 8 of minimum pressure. For the purpose of illustration, I have shown in Fig. 15 a pressure curve of the suction nozzle based on certain tests made by me, but it is to be understood that the invention is not to be construed as being limited to those or to any other specific pressures. The line 85 represents the pressure of the steam in the main, which in the present case is 175 pounds absolute. While passing through the nozzle the pressure is decreased, as at 86, to 174 pounds absolute, due to the over-compounding of the nozzle, and at this point the pipe 3 is connected. As the steam flows through the pipe or shield 11 around the nozzle 9, it causes a drop in pressure at the discharge end of the nozzle due to the ejector action of the parts. This difference in pressure is indicated in Fig. 15, wherein 86 represents the minimum pressure, 87 the pressure at the end of the nozzle 9 and 88 the pressure of the main beyond the nozzle.

In Fig. 14 is shown a nozzle that I have found to give excellent results. It comprises a truncated cone 9 containing a smaller cone 10 eccentrically disposed therein and resting on the bottom. The inner cone can be made adjustable or not as desired, since changing its position changes the expansion ratio. To obtain the best results I have found it desirable to connect the tube 3 so that the pressure therein will correspond with that of point 86 of Fig. 15.

Turning now to the instrument proper, it comprises a base 12, Fig. 1, on which is a standard 13 to which is hinged at one end a bed-plate 14. The other end of the bed-plate is supported on posts 15 which consist of two parts screwed together to render the post adjustable in length, so that the bed-plate can be inclined at a desired angle with the base—preferably about ten degrees to the horizontal. I may, however, incline the bed-plate at any other suitable angle up to ninety degrees. At each end of the bed-plate is secured a head 16—17, and side plates 18 of sheet metal are attached to the heads and the bed-plate. The gage tube containing the mercury is composed of two sections or lengths of heavy glass tubing 19—20 arranged parallel with each other and supported at each end in the heads, the lower head 17 containing a passage 21 connecting the tube sections at that end, so that it forms substantially a U-shaped structure. The tubes are so arranged that they can readily be removed by taking off the caps 30 and loosening the packings, and this without disturbing any other portion of the meter. The advantages of such a construction are many, chief among them being the ease with which a tube can be removed and cleaned or a new tube inserted. The bore of the U-tube is made small and all pockets or enlargements in the connecting passage are perfectly avoided so that the total volume of mercury will be small and errors due to expansion and contraction of the mercury can be disregarded. The tubes are parallel, as I have found such an arrangement to be satisfactory, but they can be disposed in other than parallel relation. The legs of the U are connected respectively with the pipes 2, 3, preferably in the manner now to be described.

The pipes 2, 3 enter the top of a valve chest 22 fastened upon the upper head 16, and containing a double or multiple valve 23 which controls both pipes simultaneously. This valve may be a rotary plug valve having two diametrical through ports 24, Figs. 4 and 12, in the same axial plane. Lateral ports 25 at right angles to the ports 24 make the construction that of two three-way plug valves on the same stem 26. The two end portions constituting the three-way plug valves are interconnected by a central portion of reduced section and each end valve controls a separate conduit. Exhaust ports 27 are provided in the wall of the valve chest to permit the pipes 2, 3 to be blown out when desired. Ports 28, Fig. 12, in line with the ports 24, connect the pipes 2, 3 with chambers or reservoirs 29 in the upper head 16 into which the upper ends of the tube sections enter. The chambers preferably extend out through the upper side of the head 16 where they are provided with removable closures, preferably screw caps 30 fitting upon screw-threaded necks 31 projecting from the head 16. The chambers or reservoirs 29 are preferably made large with respect to the bore of the U-tube, so that there will be no appreciable change in head of the water therein due to movements of the mercury. Without this or some equivalent device the water would introduce a slight error in the reading. The tube sections, where they enter the head 16, are surrounded by packing 32, preferably held by glands 33 and nuts 34 in nipples 35 formed on the head 16. Each chamber or reservoir 29 has an overflow duct 36, Fig. 3, drilled in a lug 37 on the end of the head 16 and provided with a regulating valve, such as the screw-plug 38 tapped into said lug.

The lower ends of the gage tube sections are secured to the lower head 17 by nipples 39, Fig. 5, packing 40, glands 41 and nuts 42, similar to the construction at the upper ends. The passage 21 in the lower head 17 which connects the bores of the gage tubes is controlled by a throttling valve consisting preferably of a reciprocating valve 43 having a screw-threaded stem 44 tapped into a hole drilled in the head 17 and intersecting the passage 21. The stem is provided with packing 45 located in a nipple 46 on said head and compressed by a gland 47 and a nut 48. A handwheel 49 is provided for operating the valve. When the meter is used in connection with a rapidly fluctuating steam supply, as for example, the exhaust from rolling mill engines, the throttle valve acts primarily as a damper to prevent the column of mercury from surging back and forth but permits the column to move steadily to-or-fro as the conditions change. It is practically impossible to shut the end valves at the same instant and permit the pressures in the tubes to die out equally, or to open them simultaneously, and so means are provided to insure the proper working. Since a difference of one pound in pressures on the two branches of the tube will throw the mercury entirely out of the said tube, the multiple steam valve 23 is made to open and close both the pipes 2—3 at exactly the same instant. As a precautionary measure, however, a device is provided for compelling the throttling valve 43 to be closed before the multiple steam valve is operated, so as to prevent accident in case steam should happen to enter one leg of the tube in advance of the other. This end is accomplished by interlocking the steam valve and the throttling valve in such manner that the former cannot be opened until after the latter is closed. A mechanism suitable for accomplishing this result comprises a disk or collar 50, Figs. 1, 2 and 5, on the stem of the throttling valve containing a socket 51 which, when said valve is shut, comes in line with one end of a rod 52 sliding in bearings 53 on one of the side-plates. The other end of the rod is urged by a spring 54 against a disk 55, Fig. 1, on the stem of the steam valve. Said disk is notched at 56 leaving between said notches a long cylindrical surface 57 and a short cylindrical surface 58. In Fig. 1 the throttling valve is closed, and the steam valve is supposed to have been just opened by turning its handle 59, in the direction of the arrow. The long surface 57 has been moved out of the path of the rod 52, whose spring has pulled it to the right into the notch 56, and withdrawn its other end from the socket in the collar 50, thus unlocking the throttling valve so that it can be opened to permit the instrument to operate. But before the steam valve can be turned in either direction, (one way to shut off the steam, and the other to connect the steam pipe with the exhaust ports), the throttling valve must be closed, and the locking rod drawn back to permit either the long surface 57 or the short surface 58 to pass by the end of the rod.

When the meter is in operation, the water of condensation collects in the tube sections above the mercury and fills the chambers 29 up to the level of the overflow ducts 36, through which the excess of water drains off, accompanied by a constant escape of steam in small quantities. The difference between the lengths of the water columns is always the same as that between the mercury columns, provided the water is always at the level of the overflow ducts. The instrument therefore functions as the sum of two gages; one a mercury gage and the other a water gage. The column of water resting on the mercury column flattens the meniscus and by its action on the rays of light causes the separating surface to be sharply defined, thus enabling very accurate readings to be made. The body of water in the chambers 29, in addition to functioning as above described, serves to lubricate the walls of the bore and prevent the mercury from clinging thereto.

On each tube section is a marker, comprising a sliding sleeve having a cutaway portion spanned by a thin transverse bridge which can be set to coincide with the end of the mercury column. The sleeve 60, Figs. 1 and 2, on the pressure side of the meter is attached to a plate 61 which is engaged by the lower end of a cylinder 62 carrying the graduated scale for giving the readings. The scale is shown developed in Fig. 18. The lines extending diagonally across the scale substantially follow logarithmic curves and are ascertained by calculation, by test, or both. To assist in the reading of the instrument, certain of these lines are made heavier than the others. These lines are marked with the number of pounds of steam flowing per unit of time, as for example: 4000, 4500, 5000, etc., intermediate values being ascertained by the intervening lines. The position of the cylinder 62 determines what portion of any given line will coincide with the end of the adjustable pointer. Irrespective of the pressure in the main a change of 14 degrees in temperature with less than one hundred degrees superheat causes a change of one per cent. in the deflection of the mercury column, the flow and pressure remaining constant. If the superheat is increased to one hundred degrees or more, I find that a change of thirteen degrees in temperature causes a change of one per cent. in the deflection of the mercury column. To correct for varying superheat over the range of the meter, the empirical curves on the scale, Fig. 18, are so plotted that they are just enough closer on the right-hand or high-pressure side of the scale than on the left-hand or low-pressure side of the scale to compensate for said variations.

The sleeve 63 is attached to a carriage 64 sliding on a bar 65 secured to the adjacent side-plate. The under side of the bar is a rack, with which meshes a pinion 66, Fig. 7, on an arbor 67 journaled in the carriage and provided with a milled hand-wheel 68. A flat spring 69 is attached to the carriage and rests on top of the bar to retain the carriage by friction at any point to which it may be moved by turning the wheel 68. The carriage has an index or pointer 70 extending over the cylinder 62. By sliding the cylinder down until the bridge 71 of the marker 60 registers with the low end of the mercury column, and running up the carriage 64 until the bridge of its marker registers with the high end of said column in the sight tube 20, the index will then give a reading on the scale, Fig. 18, corresponding to the flow of steam through the main, the scale having been adjusted for superheat and pressure as subsequently described. In order to slide the cylinder lengthwise, suitable mechanism is provided, preferably as follows:—The cylinder is guided at its upper end in a cylindrical hole in the head 16. The lower end is splined upon a spindle, preferably a tube 72 fixed at one end in the lower head 17. A shaft 73 extends through said tube and has near its upper end a transverse pin 74, Fig. 6, whose projecting ends engage with a helical rib 75 on the inside of the cylinder. When the shaft is rotated by means of its head 76, the pin, acting upon the rib, causes the cylinder to slide lengthwise, but without rotating.

In order to get the proper readings for various degrees of superheat and pressure, the cylinder is made rotatable, preferably by mounting the tube 72 in a bearing 77 in the lower head 17, and the tube 72 is provided with a graduated index wheel 78 rotating adjacent to a fixed graduated segment 79. A clamping screw 80 passes through a slot 81 in said wheel concentric with its axis. The wheel is graduated for steam pressure and the segment for degrees of superheat. It may, however, be graduated for temperature. By observing these factors, as indicated by suitable gages connected with the steam main, such as the steam pressure gage 102, Fig. 13, and then bringing the corresponding number on the index wheel and segment into coincidence, the correct flow readings for that pressure and superheat will be given by the cylinder.

In order to eliminate errors due to improper leveling of the instruments, which would materially affect the readings, two levels 82, 83, Figs. 1 and 2, are arranged on the frame at right angles to each other. Since a slight difference in level of the tubes would mean a difference in head between the columns, the importance of having properly leveled tubes is apparent.

The mercury is introduced into the gage tube by removing one of the screw caps 30 and inserting a funnel through the chamber 29. Access to the tubes for the purpose of cleaning them can be had in the same way. By using straight tube sections the cost of renewals in case of breakage is reduced to a minimum. The mercury is not subject to oxidation, as it is always covered by a body of water which does not change. Hence the accuracy of the meter is not impaired by long service. The quantity of mercury in the tube 21 is so small that the instrument does not require temperature corrections. Since the reading indicates the difference in the heights of the two columns of mercury, and is not wholly dependent on the actual quantity of mercury in the gage, the tube can be refilled without the necessity of exercising great care in putting in exactly the same quantity as before. With ten degrees inclination of the gage tube from the horizontal, there is five or six inches difference in level between the two mercury columns, with a steam flow of 100 feet per second.

It is desirable to provide individual valves for shutting off and admitting elastic fluid to the U-tube so that they can be separately adjusted in case of leakage. In Figs. 16 and 17 are shown valves of this construction having a suitable interlocking mechanism between them and the throttle valve at the opposite end of the instrument. 89 represents one of the independently adjustable valves, and 90 the other. Mounted on the spindle of valve 89 is a disk 91 connected by a rod 92 with a disk 93 on the stem of valve 90. The disk 93 has an eccentric bore containing the eccentric 94 and is inclosed by the eccentric strap 95 so that when the eccentric 94 is rotated, as by rotating the valve 89, it will move the strap in one direction or the other. On the stem of each valve is a pin 95′ adapted to engage stops at the ends of the travel of the valves. Rotating the valve 89 to the left until the pin 95′ strikes the upper stop, will rotate the eccentric 93 to the right and the latter will move the eccentric strap to the right, Fig. 16. The strap is pivotally connected to the lever 96 which is carried by the vertical rock-shaft 97. On the lower end of the shaft is formed a crank pivotally secured to the interlocking rod 98, and on the end of the latter is a frame carrying oppositely disposed pins 99 and 100. On the stem of the throttle valve 43 is a disk 101 having oppositely disposed recesses adapted to receive the pins 99 and 100. From this it follows that the movement of the eccentric strap referred to will cause the pin 100 to enter the recess opposite it and lock the throttle valve. Assuming now that the parts are in the position shown in Fig. 16 and it is desired to move valve 90 and lock the throttle valve: rotating the valve spindle to the left will also rotate the eccentric to the left and move the outer eccentric 93 about its axis. This results in moving the eccentric strap to the left and the rod 98 causes the pin 99 to enter the recess opposite it in the disk 101 and lock the throttle valve. From this it follows that before either valve 89 or 90 can be opened the throttle valve must be in its closed position.

Under certain conditions I may leave off the pipe or shield 11 but this will decrease the deflection of the mercury or other column. I may also omit the nozzle 7 under certain conditions. Where the velocity of the fluid in the main is high the importance of the nozzle and shield 11 is not so great, but where the velocity is low it becomes necessary to use said devices or equivalents to obtain the best results.

I have shown a scale arrangement which I have found to be most satisfactory in practice, but the invention is not to be construed as specifically limited thereto unless so stated in the claims because I have used other forms of scale arrangements with success.

I have shown what I consider to be the best arrangement of parts for referring the movements of the mercury column to the scale, but a variety of other means may be employed for this purpose, and in the broader aspects of the invention I aim to include such means in the claims.

A meter of this character depends for its operation upon very small differences in pressure, and said pressure difference for commercial service is never more than a fraction of a per cent. of the pressure in the main. Such being the case, it follows that there must be an absence of friction to insure accuracy. This I attain by using a column of mercury and further by lubricating the bore of the tube with water. As the mercury column is not called upon to do any work, it follows that a very small difference in pressure suffices to move the column from one position to another. Since the meter is to all intents and purposes free from friction, it follows that the readings will be accurate in the extreme.

By the construction employed I am able to dispense with all mechanical or electrical devices for transmitting the movements of the mercury column to the pointer and scale-carrying drum but in certain of its aspects my invention is broad enough to include such devices.

I have illustrated in combination with my meter an agent that I have found suitable in practice for creating a pressure difference which is responsive to changes in the rate of flow of a fluid passing through a main, but it is to be understood that the invention is not limited to the specific form shown, unless so specified in the claims, since other well known means may be employed for the purpose.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A meter for measuring the flow of an elastic fluid in a main comprising means serving to convert the velocity head of a portion of the fluid column in the main into a pressure head which varies with variations in the flow of fluid in the main, a scale calibrated in terms of the rate of flow, means for indicating on the scale the amount of fluid flowing in the main as determined by said pressure creating means, and means for adjusting the scale and indicating means with respect to each other to compensate for changes in the condition of the fluid being measured.

2. A meter for measuring the flow of an elastic fluid flowing in a main, comprising a conduit in shunt to the main between the ends of which a pressure difference is maintained that varies with variations in the amount of fluid flowing in the main, means for indicating the variations in said pressure difference, and means for adjusting said indicating means to compensate for variations in the condition of the fluid being measured, said means including a member calibrated in terms of said condition.

3. A meter for measuring the flow of an elastic fluid flowing in a main, comprising a conduit in shunt to the main between the ends of which a pressure difference is maintained that varies with variations in the amount of fluid flowing in the main, means for indicating the variations in said pressure difference, and means for adjusting the indicating means to compensate for variations in pressure of the fluid in the main, said means including a member calibrated in terms of pressure.

4. A meter for measuring the flow of an elastic fluid in a main, comprising a conduit between the ends of which a pressure difference is maintained that varies with variations in the amount of fluid flowing in the main, means connecting the conduit and the main, means for indicating the variations in said pressure difference, and a device coöperating with said indicating means for adjusting it to compensate for variations in temperature of the fluid in said main, said device including a member calibrated in terms of temperature.

5. A meter for measuring the flow of an elastic fluid flowing in a main, comprising a conduit in shunt to the main between the ends of which a pressure difference is maintained that varies with variations in the amount of fluid flowing in the main, means for indicating the variations in the pressure difference, and means for adjusting the indicating means to compensate for both temperature and pressure changes of the fluid in the main, said means including members calibrated in terms of temperature and pressure.

6. A meter for measuring the flow of an elastic fluid through a main, comprising a conduit, means connecting the conduit to the main, a column of liquid in the conduit the position of which changes with variations in the quantity of fluid flowing in the main, a direct-reading scale calibrated in terms of the weight of fluid flowing per unit of time, means for setting the scale for a given condition of the fluid, and an indicator which when set to show the position of said column will indicate on the scale the quantity of fluid in said condition flowing in the main.

7. A meter for measuring the flow of an elastic fluid through a main, comprising a conduit, means connecting the conduit with the main, a column of liquid in the conduit the position of which changes with variations in the quantity of fluid flowing through the main, a scale suitably calibrated in terms of the rate of flow, means for changing the position of the scale relative to the column to compensate for variations in the condition of the fluid being measured, and an indicator which when set to indicate the position of the column will coöperate with the scale to give the desired indication.

8. A meter for measuring the flow of an elastic fluid through a main, comprising a conduit, means connecting the conduit with the main, a column of liquid in the conduit the position of which changes with variations in the amount of fluid flowing through the main, a direct reading scale calibrated in terms of the weight of fluid flowing per unit of time under different conditions of the fluid in the main, a second scale that is calibrated in terms of a condition of the fluid, means for shifting the relative position of the scales to compensate for variations in the condition of the fluid being measured, and an indicator which when set to show the position of said column will indicate on the first scale the quantity of fluid flowing through the main.

9. A meter for measuring the flow of an elastic fluid in a main, comprising a column of liquid, a container for the column, means for sharply defining the meniscus at the ends of said column, a scale suitably marked in terms of the rate of flow and arranged adjacent to the column, means for setting the scale for a given condition of the fluid, and a movable pointer which when moved to register with one end of the column will indicate on the scale the amount of fluid flowing in the main under said condition.

10. A meter for measuring the flow of an elastic fluid comprising a U-shaped body of liquid inclined at an angle to the horizontal, containing means for said body, and a device for adjusting the inclination of said means and the body contained therein.

11. A meter for measuring the flow of an elastic fluid comprising a U-shaped column of mercury inclined at an angle to the horizontal, water columns on each end of the mercury column, containing means for said columns, and a device for adjusting the inclination of said means and the contained columns.

12. A meter for measuring the flow of an elastic fluid comprising a U-shaped column of mercury inclined at an angle to the horizontal, water columns on each end of the mercury column, means for maintaining said water columns at a constant level, containing means for said columns, and a device for varying the inclination of said means and its contained columns.

13. A steam flow meter comprising a U-shaped column of liquid, columns of another liquid on the ends of said U-shaped column, containing means for the columns provided with outlets for permitting an overflow of the excess of the second named liquid from said containing means to maintain the columns of said liquid at a constant level, and valves controlling the outlets.

14. A steam flow meter comprising a U-shaped column of liquid, a container for the column, pipes for conveying pressure to the ends of said column, and means for simultaneously opening and closing said pipes.

15. A meter for measuring the flow of steam through a main, comprising a U-shaped gage tube, a support for the tube, means for adjusting the position of the tube on the support to vary its inclination, a column of liquid in said tube, conduits connecting the ends of the tube to the main, means for creating a pressure difference in said conduits that varies with changes in the rate of flow through the main and acts on the column, and a valve for closing said tube below the level of the ends of the liquid column.

16. A meter for measuring the flow of steam through a main, comprising a U-shaped gage tube, a support for the tube, means for adjusting the position of the tube on the support to vary its inclination, a column of liquid in said tube, conduits connecting the ends of the tube with the main, means for creating a pressure difference in the conduits which varies with changes in the rate of flow through the main and acts on the column, a device for damping the movement of the column in the tube, and valves for controlling the communication between the main and said tube.

17. A steam flow meter comprising a U-shaped gage tube, a throttling valve for said tube, and valves for controlling the flow of steam to the ends of said tube, devices for opening and closing said valves, and means for interlocking said devices to control their relative movement.

18. A steam flow meter comprising a U-shaped gage-tube, a throttling valve for said tube, and valves for controlling the flow of steam to the ends of said tube, devices for opening and closing the throttling and steam valves, and means for controlling the operation of said devices which prevents the opening of the steam-valve unless the throttling valve is closed.

19. A steam flow meter comprising a base, a bed-plate pivoted thereto, a U-shaped gage-tube mounted on said bedplate, and means for adjusting said bedplate about the pivot at an angle to the horizontal.

20. A steam flow meter comprising a bed-plate mounted at an angle to the horizontal, heads on said bedplate, and gage-tube sections extending between and supported by said heads, the lower one of which has a passage connecting the tube sections.

21. A steam flow meter comprising a bed-plate mounted at an angle to the horizontal, heads on said bedplate, and gage-tube sections extending between and supported by said heads, the lower one of which has a passage connecting the tube sections, and a throttling valve on said head controlling said passage.

22. A steam flow meter comprising a bed-plate mounted at an angle to the horizontal, heads on said bedplate, gage-tube sections extending between and supported by said heads, a valve-chest mounted on the upper head, and a multiple valve for simultaneously controlling the flow of steam to the upper ends of said tube sections.

23. A steam flow meter comprising a head containing chambers, gage-tube sections entering said chambers, overflow ducts leading from said chambers, and means for conveying steam to said chambers.

24. A steam flow meter comprising a head containing chambers opening at the upper end and having overflow ducts, closures for the ends of said chambers, gage-tube sections entering the lower ends of said chambers, and steam ports in the upper side of said chambers.

25. A steam flow meter comprising a head containing chambers having overflow ducts, a rotary multiple valve controlling the admission of steam to both chambers, and gage-tube sections entering the lower ends of said chambers.

26. A steam flow meter comprising upper and lower heads, gage-tube sections connecting said heads, the lower one of which has a passage connecting said tubes, a throttling valve for said passage, a multiple valve controlling the admission of steam to said tube-sections, a rod for locking said steam valve, and means carried by the throttling valve for controlling the movement of said rod.

27. A steam flow meter comprising a U-shaped mercury tube, means connecting the ends of the tube with the steam main, a scale calibrated in terms of the rate of flow through the main, said scale being movable lengthwise and carrying a marker to register with the lower end of the mercury column, and an adjustable index to mark the upper end of said column and to give the reading on said scale when its marker is in register with the other end of the column.

28. A steam flow meter comprising a U-shaped mercury tube, means connecting the tube with the steam main, a cylindrical scale movable lengthwise and rotatable, markers adjustable along both legs of the mercury column, and an index on one marker coöperating with the cylindrical scale.

29. A steam flow meter comprising a U-shaped mercury tube, means connecting the tube with the steam main, a cylindrical scale adjacent the tube for determining the flow from the relative position of the mercury in the branches of the tube, said scale being adjustable lengthwise and angularly, and means for adjusting said scale to compensate for pressure and superheat.

30. A steam flow meter comprising a U-shaped mercury tube, means connecting the tube with the steam main, a rotatable spindle adjacent the tube, a cylindrical scale for determining the flow from the relative position of the mercury in the branches of the tube, said scale being splined on the spindle, and means for moving said scale lengthwise.

31. A steam flow meter comprising a U-shaped mercury tube, means connecting the mercury tube with the steam main, a tube adjacent the mercury tube, a cylindrical scale splined on the last mentioned tube, a helical rib in said scale, a shaft in said tube engaging with said rib to move the cylinder lengthwise, and coöperating scales carried by the tube and the frame of the meter, whereby said cylindrical scale can be adjusted angularly for superheat and pressure.

32. A nozzle for a steam flow meter comprising a tubular truncated cone having entrance and discharge ends, and a cone inside thereof, the apex of the cone being located adjacent the nozzle entrance and its base adjacent the discharge end of the nozzle.

33. A nozzle for a steam flow meter comprising a tubular truncated cone, a cone inside thereof, and a cylindrical inclosure for said cones.

34. A nozzle for a steam flow meter comprising a tubular truncated cone, a cone inside thereof, a cylindrical inclosure for said cones, and a tube connected with said tubular cone near the base thereof.

35. A meter for measuring the flow of an elastic fluid through a main, comprising a conduit containing a column of liquid, means connecting the conduit with the main so that the position of the column changes with variations in the flow of fluid through the main, said means having valves for controlling the communication between the main and the conduit, a throttle valve in the conduit, and interlocking means between the valves.

36. A meter for measuring the flow of an elastic fluid in a main comprising a conduit containing a column of liquid, means connecting the conduit with the main so that the position of the column changes with variations in the flow of fluid in the main, and a nozzle for one end of said conduit which includes a member forming a truncated cone and a second conical member inside of the first and eccentrically arranged.

37. A meter for measuring the flow of an elastic fluid in a main, comprising conduits connecting the meter in shunt to the main, means for creating a pressure difference in said conduits which varies with variations in the rate of flow of the fluid being measured, a scale having logarithmic curves thereon to indicate the flow of fluid in the main, and an indicating device coöperating with the scale and said means.

38. A meter for measuring the flow of an elastic fluid in a conduit, comprising means containing a column of liquid, means connecting the containing means with the conduit so that the ends of the column are subjected to the pressure in the conduit, and an expansion nozzle connected to the containing means so as to be in communication with one end of said column.

39. A meter for measuring the flow of an elastic fluid through a main, comprising means containing a column of liquid, means connecting the containing means with the main so that the position of the column changes with variations in the flow of the fluid in the main, a scale having logarithmic curves plotted thereon which are closer together on one portion of the scale than on another to compensate for changes in the condition of the fluid being metered, a movable pointer which when set to register with one end of the liquid column will extend over the curves on the scale, and means for adjusting the scale and pointer with respect to each other.

40. A meter for measuring the flow of an elastic fluid through a main, comprising a column of liquid, a container for said column, means connecting the container with the main so that the position of the column changes with variations in the flow of the fluid through the main, means for determining from the position of the column the amount of fluid flowing, a damper acting on the column to prevent oscillations due to sudden changes in flow in the main, and means for angularly adjusting the container.

41. A meter for measuring the flow of an elastic fluid in a main comprising a tube containing a column of liquid the ends of which open in the same general direction, means connecting the tube with the main so that the position of the column changes with variations in flow in the main, means for leveling the tube so that the side portions will occupy the same plane to prevent a difference in head, and indicating means including a scale and pointer.

42. A meter for measuring the flow of fluid through a main, comprising a conduit in shunt to the main, a column of liquid in the conduit, means for creating a pressure difference on the ends of the column that varies with variations in the quantity of fluid flowing through the main, a scale adjacent to the column that is calibrated in terms of the rate of flow, a second scale that is calibrated in terms of a condition of the fluid, and means for adjusting the first scale relative to the second to compensate for variation in the condition of the fluid.

43. In a meter, the combination of an agent for creating a presure difference in the fluid to be metered that bears a definite relation to the rate of flow through the main, a scale calibrated in terms of the rate of flow, means for indicating on the scale the amount of fluid flowing as determined by said agent, and means for adjusting the scale and indicating means with respect to each other to compensate for changes in the condition of the fluid being metered, said means including a member calibrated in terms of said condition.

44. In a meter, the combination of an agent for creating a pressure difference in the fluid to be metered that bears a definite relation to the rate of flow through the main, a U-tube containing a column of liquid, means connecting the tube to the agent so that said pressure difference acts on the ends of the column, a scale arranged between the branches of the tube, means for moving the scale longitudinally of said branches, a marker mounted on one of the branches, means connecting the marker to the scale to move therewith, a marker mounted on the other branch, and means for moving the last marker along said branch.

45. In a meter, the combination of an agent for creating a pressure difference in the fluid to be metered that bears a definite relation to the rate of flow through the main, a U-tube containing a column of liquid, means connecting the tube to the agent so that said pressure difference acts on the ends of the column, a rotatably and slidably mounted scale arranged between the branches of the tube, means for moving the scale longitudinally of said branches, a marker mounted on one of the branches, means connecting the marker to the scale to move therewith, a marker mounted on the other branch, a device for moving the last marker along said branch, and means for rotating the scale to compensate for variations in the condition of the fluid being metered.

46. In a fluid meter, the combination of members that enter the main containing the fluid to be metered and are acted upon by the fluid in a manner to create a pressure difference that bears a definite relation to the rate of flow thereof, a fluid container, means connecting the agent and container in a manner to cause said pressure difference to displace the fluid from one portion of the container to another, a calibrated scale that is angularly adjustable to compensate for changes in pressure of the fluid being metered, and a pointer which projects in front of the scale and is adjustable in a direction parallel thereto.

47. In a fluid meter, the combination of members that are acted upon by the fluid to be metered in a manner to create a pressure difference that bears a definite relation to the rate of flow thereof, a fluid container, one portion of which comprises a transparent tube, means connecting the members and container in a manner to cause a change in said pressure difference to vary the height of the fluid in said tube, a scale which is calibrated in terms of the rate of flow and is angularly adjustable to compensate for a change in condition of the fluid being metered, and a pointer which extends over the face of the scale and the transparent tube and is adjustable in a plane parallel thereto to facilitate a comparison between the height of fluid in the tube and the markings on the scale.

48. In a fluid meter, the combination of a transparent tube, a container having connected chambers adapted to contain fluid, one of said chambers being formed in the transparent tube, a calibrated cylindrical scale that extends parallel with the tube, a support for the scale on which it is angularly adjustable to compensate for a change in condition of the fluid being metered, and a pointer which extends over said tube and scale and is movable longitudinally with respect thereto to facilitate a comparison between the height of the fluid in the tube and the markings on the scale.

In witness whereof, I have hereunto set my hand this 12th day of November, 1906.

AUSTIN R. DODGE.

Witnesses:
    BENJAMIN B. HULL,
    HELEN ORFORD.

transparent tube, a calibrated cylindrical scale that extends parallel with the tube, a support for the scale on which it is angularly adjustable to compensate for a change in condition of the fluid being metered, and a pointer which extends over said tube and scale and is movable longitudinally with respect thereto to facilitate a comparison between the height of the fluid in the tube and the markings on the scale.

In witness whereof, I have hereunto set my hand this 12th day of November, 1906.

AUSTIN R. DODGE.

Witnesses:
 BENJAMIN B. HULL,
 HELEN ORFORD.

---

Corrections in Letters Patent No. 1,087,929.

It is hereby certified that in Letters Patent No. 1,087,929, granted February 24, 1914, upon the application of Austin R. Dodge, of Schenectady, New York, for an improvement in "Meters for Measuring the Flow of an Elastic Fluid," errors appear in the printed specification requiring correction as follows: Page 2, line 83, for the word "those" read *these;* page 3, line 13, for the word "perfectly" read *preferably;* and that the said Letters Patent should be read with these corrections therein that the same may conform to the record of the case in the Patent Office.

Signed and sealed this 24th day of March, A. D., 1914.

[SEAL.]

J. T. NEWTON,

*Acting Commissioner of Patents.*

It is hereby certified that in Letters Patent No. 1,087,929, granted February 24, 1914, upon the application of Austin R. Dodge, of Schenectady, New York, for an improvement in "Meters for Measuring the Flow of an Elastic Fluid," errors appear in the printed specification requiring correction as follows: Page 2, line 83, for the word "those" read *these;* page 3, line 13, for the word "perfectly" read *preferably;* and that the said Letters Patent should be read with these corrections therein that the same may conform to the record of the case in the Patent Office.

Signed and sealed this 24th day of March, A. D., 1914.

[SEAL.]

J. T. NEWTON,
*Acting Commissioner of Patents.*